United States Patent
Filippov et al.

(10) Patent No.: US 10,520,925 B2
(45) Date of Patent: Dec. 31, 2019

(54) OPTIMIZING FLOW CONTROL DEVICE PROPERTIES ON A PRODUCER WELL IN COUPLED INJECTOR-PRODUCER LIQUID FLOODING SYSTEMS

(71) Applicant: Landmark Graphics Corporation, Houston, TX (US)

(72) Inventors: Andrey Filippov, Houston, TX (US); Vitaly Khoriakov, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 174 days.

(21) Appl. No.: 15/033,594

(22) PCT Filed: Nov. 15, 2013

(86) PCT No.: PCT/US2013/070401
§ 371 (c)(1),
(2) Date: Apr. 29, 2016

(87) PCT Pub. No.: WO2015/073032
PCT Pub. Date: May 21, 2015

(65) Prior Publication Data
US 2016/0274573 A1    Sep. 22, 2016

(51) Int. Cl.
*G05B 19/416* (2006.01)
*E21B 43/16* (2006.01)
(Continued)

(52) U.S. Cl.
CPC ........ *G05B 19/416* (2013.01); *E21B 41/0092* (2013.01); *E21B 43/16* (2013.01);
(Continued)

(58) Field of Classification Search
CPC . G05B 19/416; E21B 43/162; E21B 41/0092; E21B 43/20; E21B 43/16
See application file for complete search history.

(56) References Cited

U.S. PATENT DOCUMENTS

| | | | | |
|---|---|---|---|---|
| 4,676,313 A | * | 6/1987 | Rinaldi | E21B 43/12 166/250.15 |
| 2002/0049575 A1 | | 4/2002 | Jalali et al. | |

(Continued)

FOREIGN PATENT DOCUMENTS

| WO | WO-9902819 A1 | 1/1999 |
|---|---|---|
| WO | WO-2015016932 A1 | 2/2015 |

(Continued)

OTHER PUBLICATIONS

Ellis et al., "Inflow Control Devices—Raising Profiles", Oilfield Review (Winter 2009/2010): pp. 30-27 (from website https://www.slb.com/~/media/Files/resources/oilfield_review/ors09/win09/03_inflow_control_devices.pdf).*

(Continued)

*Primary Examiner* — Michele Fan (57) ABSTRACT

The disclosed embodiments include a computer implemented method, apparatus, and computer program product that includes executable instructions that when executed performs operations for method for determining flow control device (FCD) properties for a production well in coupled injector-producer liquid flooding systems that yields a uniform flooding front along the production well.

20 Claims, 5 Drawing Sheets

(51) Int. Cl.
*E21B 41/00* (2006.01)
*E21B 43/20* (2006.01)

(52) U.S. Cl.
CPC ............ *E21B 43/162* (2013.01); *E21B 43/20* (2013.01); *G05B 2219/37371* (2013.01)

(56) References Cited

U.S. PATENT DOCUMENTS

| | | | |
|---|---|---|---|
| 2011/0000684 A1* | 1/2011 | Charles .................. | E21B 43/12 166/386 |
| 2011/0042083 A1* | 2/2011 | Sierra .................... | E21B 43/12 166/271 |
| 2011/0079387 A1 | 4/2011 | Russell et al. | |
| 2011/0309835 A1 | 12/2011 | Barber et al. | |
| 2012/0016649 A1* | 1/2012 | Thambynayagam ... | E21B 43/12 703/10 |
| 2012/0278053 A1 | 11/2012 | Garcia et al. | |
| 2014/0054032 A1* | 2/2014 | Affholter ................ | E21B 43/24 166/272.6 |
| 2015/0034333 A1* | 2/2015 | Fripp ..................... | E21B 43/12 166/373 |

FOREIGN PATENT DOCUMENTS

| WO | WO-2015073030 A1 | 5/2015 |
|---|---|---|
| WO | WO-2015073033 A1 | 5/2015 |
| WO | WO-2015073034 A1 | 5/2015 |

OTHER PUBLICATIONS

Minulina et al., "The Design, Implementation and Use of Inflow Control Devices for Improving the Production Performance of Horizontal Wells", SPE International (2012): pp. 1-15.*

Rahimah et al., "Horizontal Well Optimization With Inflow Control Devices (ICDs) Application in Heterogeneous and Dipping Gas-Capped Oil Reservoirs", SPE International (2010): pp. 1-15.*

Kyanpour et al., "A New Approach for Designing Steam Splitters and Inflow Control Devices in Steam Assisted Gravity Drainage", SPE International (2013): pp. 1-14.*

Amaral et al., "Equalization of Water Injection Profile of a Subsea Horizontal Well: A Case History", SPE International (2008): pp. 1-6.*

Abllah et al., "Application of Inflow Control Valve (ICV) in the Water Injector Well: Case Study on Alpha Field", SPE International (2011): pp. 1-14.*

International Search Report and Written Opinion, dated Aug. 14, 2014, 12 pages, Korean Intellectual Property Office.

Su, Ho-Jeen and Dogru, Ali H., Modeling of Equalizer Production System and Smart-Well Applications in Full-Field Studies, 2007 SPE/EAGE Reservoir Characterization and Simulation Conference, Oct. 28-31, 2007, 11 pages, SPE 111288, Society of Petroleum Engineers, Abu Dhabi, UAE.

Sarma, P. and Aziz,K., Implementation of Adjoint Solution for Optimal Control of Smart Wells, 2005 SPE Reservoir Simulation Symposium, Jan. 31, 2005-Feb. 2, 2005, 17 pages, SPE 92864, Society of Petroleum Engineers, Houston, Texas.

Sharma, A., Kok, J.C., Neuschaefer R., Han, S.Y., Bieltz, T., Obvintsev A. and Riegler, P., Integration of Dynamic Modeling of ICD Completion Design and Well Placement Technology: A Case Study of GOM Shelf Reservoir, SPE Annual Technical Conference and Exhibition, Oct. 30-Nov. 2, 2011, 12 pages, SPE 146454, Society of Petroleum Engineers, Denver, Colorado.

Thornton, Kim, Jorquera, Ricardo and Soliman, M.Y., Optimization of Inflow Control Device Placement and Mechanical Conformance Decisions Using a New Coupled Well-Intervention Simulator, Nov. 11-14, 2012, 13 pages., SPE 162471, Society of Petroleum Engineers, Abu Dhabi, UAE.

Kaiser, T.M.V. Wilson, S. and Venning, L.A., Inflow Analysis and Optimization of Slotted Liners, Nov. 6-8, 2000, 12 pages, SPE 65517, Society of Petroleum Engineers, Calgary, Alberta, Canada.

Yeten, Burak, Durlofsky, Louis J. and Aziz, Khalid, Optimization of Smart Well Control, Nov. 4-7, 2002, 10 pages, SPE 79031, Society of Petroleum Engineers, Calgary, Alberta, Canada.

* cited by examiner

OPTIMIZING FLOW CONTROL DEVICE PROPERTIES ON A PRODUCER WELL IN COUPLED INJECTOR-PRODUCER LIQUID FLOODING SYSTEMS

CROSS-REFERENCE TO RELATED APPLICATIONS

This application is a U.S. national stage patent application of International Patent Application No. PCT/US2013/070401, filed on Nov. 15, 2013, the benefit of which is claimed and the disclosure of which is incorporated herein by reference in its entirety.

BACKGROUND OF THE INVENTION

1. Field of the Invention

The present disclosure relates generally to the recovery of subterranean deposits and more specifically to methods and systems for optimizing the placement and other properties of one or more flow control devices along a production well in coupled injector-producer liquid flooding systems for the purpose of improving recovery from a reservoir.

2. Discussion of the Related Art

Liquid injection refers to the method in the oil industry where fluid (usually water) is injected into the reservoir to increase pressure and stimulate production. For example, in certain instances, the water replaces the oil which has been taken, thus, maintaining the production rate and the pressure over the long term. In addition, in certain situations, the water displaces or sweeps oil from the reservoir and pushes it towards a well. Liquid injection wells can be found both on and off shore to increase oil recovery from an existing reservoir.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

As stated above, water injection is a widely used method of providing reservoir pressure support that significantly increases the amount of oil recovered from a reservoir. Water injection is used in both vertical and horizontal wells. The injected water, sometimes with chemical additives, helps to increase depleted pressure in reservoir and move the oil in the direction of the production well. However, due to the frictional pressure drop and reservoir permeability variations along the well, there is usually a non-uniform fluid flux along the well length. For instance, typically, higher injection and production flow rates occur at the heel of the well that increases the possibility of breakthrough of injected liquid in this area.

Figure 1:
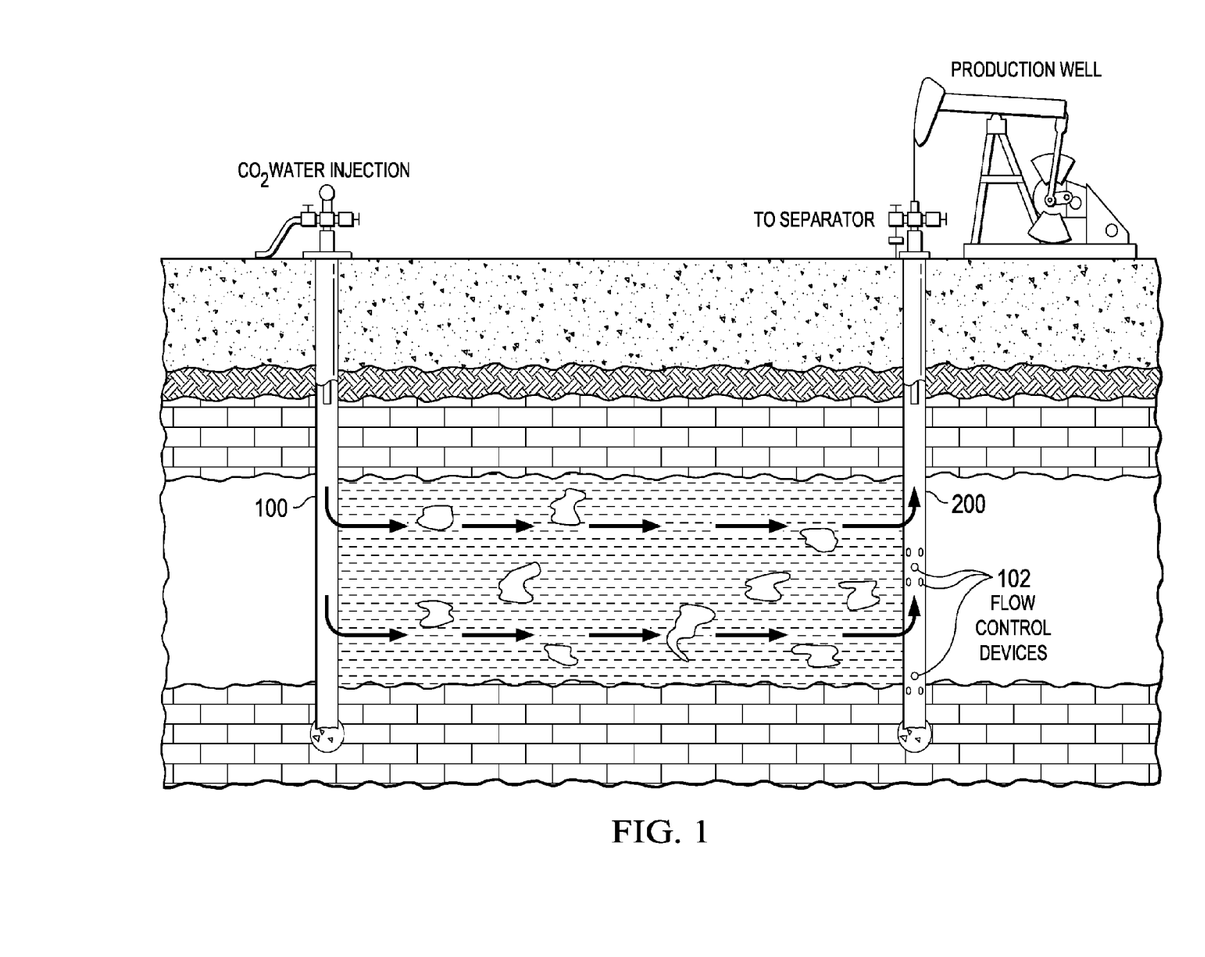
FIG. 1 is a diagram depicting a liquid injection method that uses flow control devices on a production well in accordance with the disclosed embodiments.

In accordance with the disclosed embodiments, one method to counter this imbalance is to use one or more flow control devices (FCDs) 102 along a production well 200 to balance or equalize flow rates by creating additional pressure drop at the well wall as illustrated in FIG. 1. As referenced herein, a flow control device (FCD) is any device including an inflow control device (ICD) that is coupled to a wellbore that causes a pressure drop between the wellbore and a reservoir to reduce flow between the wellbore and the reservoir at the location of the flow control device. Non-limiting real examples of FCDs in accordance with the disclosed embodiments include the EquiFlow® Inject system and the EquiFlow® inflow control device (ICD) both available from Halliburton®.

To optimize production from wells assisted by liquid flooding, the FCD design must account for high drawdown from heel to toe and reservoir heterogeneity. For optimal production, the FCD placement needs to be linked to detailed physical characteristics of the reservoir and wellbore. However, to date, no easy methods for determining the proper placement or other properties of FCDs have been developed. Instead, current methods rely on a manual trial and error process in which various sizing/types and placement of FCDs are simulated along a horizontal well using simulation software such as NETool™ available from Landmark Graphics Corporation.

Therefore, the disclosed embodiments present a numerical algorithm and simulation approach for calculating the optimal FCD placement and other parameters (e.g., number of holes and hole sizes, and/or number and types of FCDs) for a production well in coupled injector-producer liquid flooding systems that yields a uniform flooding front along the wellbore for maximizing the overall recovery of oil.

The disclosed embodiments will be illustrated by several examples utilizing a simplified coupled reservoir-wellbore hydrodynamic model which accounts for FCD effects on the flow in the injection and production wellbore and flooding dynamics. However, the disclosed embodiments and methodology can be applied to coupled reservoir-wellbore models of varying levels of complexity.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Figure 2:
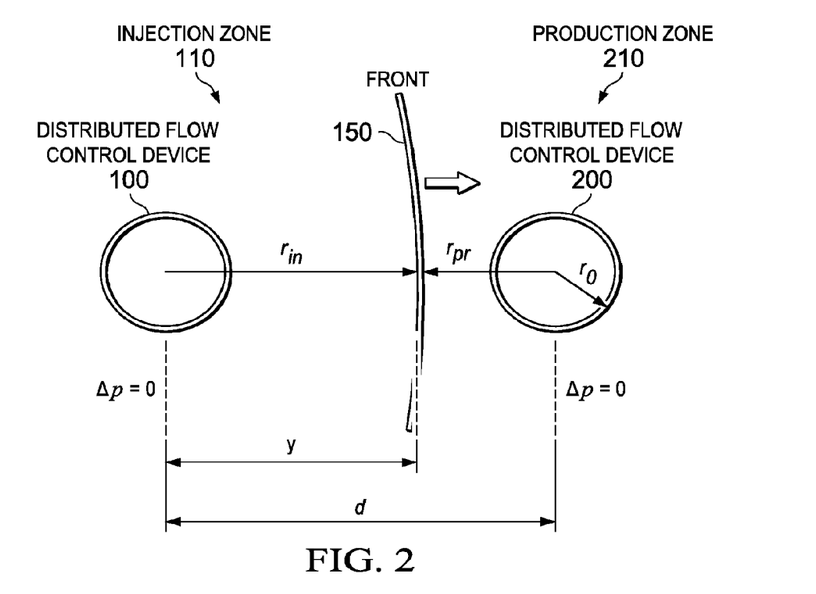
FIG. 2 is a schematic diagram indicating a cross-section of the reservoir area next to a pair of injection and production wells in accordance with a disclosed embodiment.

With reference now to FIG. 2, a diagram depicting a schematic of the cross-section of the reservoir area next to a pair of injection and production wells is presented. The injection zone 110 near the injection well 100 is filled with injected fluid, while the liquid occupying the production zone 210 near the production well 200 is mostly oil. The injection zone 110 and the production zone 210 are separated by the displacement front 150, slowly moving away from the injection well 100 to the production well 200. In one embodiment, the pressure distributions in both the injection zone 110 and the production zone 210 are determined using the Laplace equations, which are postulated to have the following simple form:

$$p_{in} = a_{in}\ln\left(\frac{|r - r_{in}|}{r_0}\right) + b_{in}\ln\left(\frac{|r - r_{pr}|}{r_0}\right) + c_{in} \quad \text{(Equation 1)}$$

$$p_{pr} = a_{pr}\ln\left(\frac{|r - r_{pr}|}{r_0}\right) + b_{pr}\ln\left(\frac{|r - r_{in}|}{r_0}\right) + c_{pr} \quad \text{(Equation 1.1)}$$

where $r_{in}$ and $r_{pr}$ are the radius-vectors of the centers of the injection and production well, respectively, and $r_0$ is the well radius, assumed to be the same for both wells. Significant differences of physical properties of the injection liquid and oil are accounted by the fact that the coefficients $a_{in}$, $b_{in}$ and $c_{in}$ for the injection zone are different from the corresponding coefficients for the expansion coefficients in the production zone $a_{pr}$, $b_{pr}$ and $c_{pr}$. These coefficients are found from the continuity conditions at the front and the reservoir boundary:

In one embodiment, pressures at the well-reservoir boundary (sandface) $p_i^e$ and $p_p^e$ are found from solving the fluid dynamics problems in the wells and used to determine constants in Equations 1 and 1.1 according to the following equations:

$$|r - r_{in}| = r_0, |r - r_{pr}| = d: p_{in} = p_i^e \quad \text{(Equation 2)}$$

$$|r - r_{pr}| = r_0, |r - r_{in}| = d: p_{pr} = p_p^e \quad \text{(Equation 2.1)}$$

$$p_p^e = b_{pr}\ln\left(\frac{d}{r_0}\right) + c_{pr};\ p_i^e = b_{in}\ln\left(\frac{d}{r_0}\right) + c_{in} \quad \text{(Equation 2.2)}$$

where d is the distance between the wells, which is assumed to be much larger than their radii. In addition, in certain embodiments, a pressure value at the reservoir boundary $p_B$ is used to determine constants in Equations 1 and 1.1 according to the following equations:

$$|r - r_{pr}| = r_B: p_{pr} = p_B \quad \text{(Equation 3)}$$

$$p_B = a_{pr}\ln\left(\frac{r_B}{r_0}\right) + b_{pr}\ln\left(\frac{r_B}{r_0}\right) + c_{pr} \quad \text{(Equation 3.1)}$$

In one embodiment, the pressure is set to be continuous across the displacement front based on the following set of equations:

$$|r - r_{in}| = y, |r - r_{pr}| = d - y: p_{in} = p_{pr} \quad \text{(Equation 4)}$$

$$a_{in}\ln\left(\frac{y}{r_0}\right) + b_{in}\ln\left(\frac{d-y}{r_0}\right) + c_{in} = \quad \text{(Equation 4.1)}$$

$$a_{pr}\ln\left(\frac{d-y}{r_0}\right) + b_{pr}\ln\left(\frac{y}{r_0}\right) + c_{pr}$$

where y is the distance between the front and the center injection well along the line connecting the centers of the wells. In one embodiment, the front velocity written in terms of each of the expressions for pressure (as expressed in Equations 1 and 1.1) is assumed to be the same and is determined based on the following set of equations:

$$V_f = V_{fi} = V_{fp} \quad \text{(Equation 5)}$$

$$V_{fi} = -\frac{k_0 k'_{in}}{\varphi \Delta S_{in} \mu_{in}} n \cdot \nabla p_{in};\ V_{fp} = -\frac{k_0 k'_{pr}}{\varphi \Delta S_0 \mu_{pr}} n \cdot \nabla p_{in} \quad \text{(Equation 5.1)}$$

$$\frac{a_{in}}{y} - \frac{b_{in}}{d-y} = \gamma\left(\frac{b_{pr}}{y} - \frac{a_{pr}}{d-y}\right);\ \gamma = \frac{k'_{pr}\mu_{in}\Delta S_{in}}{k'_{in}\mu_{pr}\Delta S_{pr}} \quad \text{(Equation 5.2)}$$

$$a_{in} = \gamma b_{pr} \Rightarrow b_{in} = \gamma a_{pr} \quad \text{(Equation 5.3)}$$

where $V_f$ is the front speed, $k_0$ and $\phi$ are the absolute permeability and porosity of the formation, $k'_{in}$ and $k'_{pr}$ are the relative permeabilities of injected liquid and oil, $\mu_{in}$ and $\mu_{pr}$ are the viscosities of these liquids, and $\Delta S_{in}$ and $\Delta S_{pr}$ are the saturation changes at the front for the injected liquid and oil. In one embodiment, the proportionality of coefficients $a_{in}$ and $b_{pr}$ is obtained by integrating Equation 5.1 along the contour representing the displacement front. Accounting for Equation 5.2, representing the equality of velocities $V_{fi}$ and $V_{fp}$ at the intersection of the front and the line connecting producer and injector, results in the proportionality between the coefficients $b_{in}$ and $a_{pr}$.

In one embodiment, the linear system of Equations 2-5 can be solved to find the coefficients $a_{in}$, $b_{in}$, $c_{in}$, $a_{pr}$, $b_{pr}$ and $c_{pr}$, provided that the pressure distributions at the sandface ($r=r_0$) of the injector and producer wells $p_i^e(z)$ and $p_p^e(z)$ are known. These distributions can be found by solving the following system of fluid dynamics equations for the flows in wells:

$$\frac{dq_i}{dz} = J_i; \quad q_i = \rho_i V_i A_i; \quad i = in, pr \qquad \text{(Equation 6)}$$

$$\frac{dp_i}{dz} = -\frac{1}{2D_i} f_{id} \rho_i V_i^2 \qquad \text{(Equation 6.1)}$$

$$J_{pr} = \frac{Cs_{or}^0}{L_{or}} \sqrt{2\rho_i f(z)(p_{pr} - p_{pr}^e)} \; ; \; p_{in} = p_{in}^e \qquad \text{(Equation 6.2)}$$

$$f(z) = \left(\frac{s_{or}}{s_{or}^0} \frac{L_{or}}{L_{or}^0}\right)^2 \qquad \text{(Equation 6.3)}$$

where i is the index equal to in and pr for the injector and production well, respectively, $\rho_i$ and $V_i$ are the fluid density and average flow velocity, $A_i$ and $D_i$ are the wellbore cross-section area and diameter, $q_i$ is the mass flow rate, $f_{id}$ is the Darcy friction factor, $s_{or}$ and $L_{or}$ are the FCD orifice cross-section and spacing, respectively, with some default values $s_{or}^0$ and $L_{or}^0$, and C is the orifice flow coefficient. Equations 6-6.3 describe a pair of horizontal injector and producer well. Due to the incompressibility of the liquids, the vertical case can be also considered within the frame of this model using the following substitute:

$$p_i \to p_i + \rho_i g z \qquad \text{(Equation 7)}$$

where g is the gravity acceleration.

In accordance with the disclosed embodiments, the FCD devices are installed only on the production well, so the pressure inside the injection well $p_{in}$ is the same as the pressure $p_{in}^e$ in the formation immediately next to it. Function $f(z)$ characterizes the longitudinal variation of hole diameter or linear density of FCD devices. Increase of $f(z)$ results in reduction the pressure drop across the FCD and therefore increase of the local production rates $J_{pr}$ at point z that can be determined, in one embodiment, using the below equation. These rates are related to the coefficients $a_{in}$ and $a_{pr}$ in Equations 1-1.1:

$$J_i = -\frac{2\pi k_0 k_i'}{\mu_{in}} a_i; \quad i = in, pr \qquad \text{(Equation 8)}$$

The disclosed process can then solve Equations 1-7 to find flow distribution inside and outside the wells for any given profile of the front y(z) in the plane containing axes of both wells. However, in order to find the evolution of the front in time, in one embodiment, the disclosed process simultaneously solves the following equation with Equations 1-7:

$$\frac{dy}{dt} = -\frac{k_0 k_{in}'}{\varphi \Delta S_{in} \mu_{in}} \left(\frac{a_{in}}{y} - \frac{b_{in}}{d-y}\right) \qquad \text{(Equation 9)}$$

Equation 8 follows from the set of equations 5 for the front velocity $V_f$. Initially, the front coincides with the injector well surface in accordance with the below conditions:

$$t=0; 0 \leq z \leq L; y=r_0 \qquad \text{(Equation 10)}$$

where L is the well length, assumed to be the same for both the injection and the production well. At a moment $t_m$, the front reaches the production well at some location $z_1$:

$$y(z_1, t_m) = d - r_0 \qquad \text{(Equation 11)}$$

Equation 11 is the condition of breakthrough at point $z_i$. Due to pressure variations along the wells and inhomogeneity of the reservoir properties, the front does not reach the production well at other locations:

$$z \neq z_1 : y(z, t_m) < d - r_0 \qquad \text{(Equation 12)}$$

In accordance with the disclosed embodiments, one goal of the optimized FCD placement is to find a such FCD distribution, characterized by the function $f(z)$, that the FCDs compensate the pressure drop and formation properties' variation, so that the displacement front approaches the production well uniformly:

$$t=t_m; 0 \leq z \leq L; y(z,t) = d - r_0 \qquad \text{(Equation 13)}$$

In one embodiment, the disclosed optimization algorithm uses the solution of the initial-boundary value problem (Equations 1-10) for finding the FCD distribution function $f(z)$ such, that the displacement front approaches the production well uniformly and condition/Equation 13 is fulfilled at a certain moment $t_m$.

Figure 3:
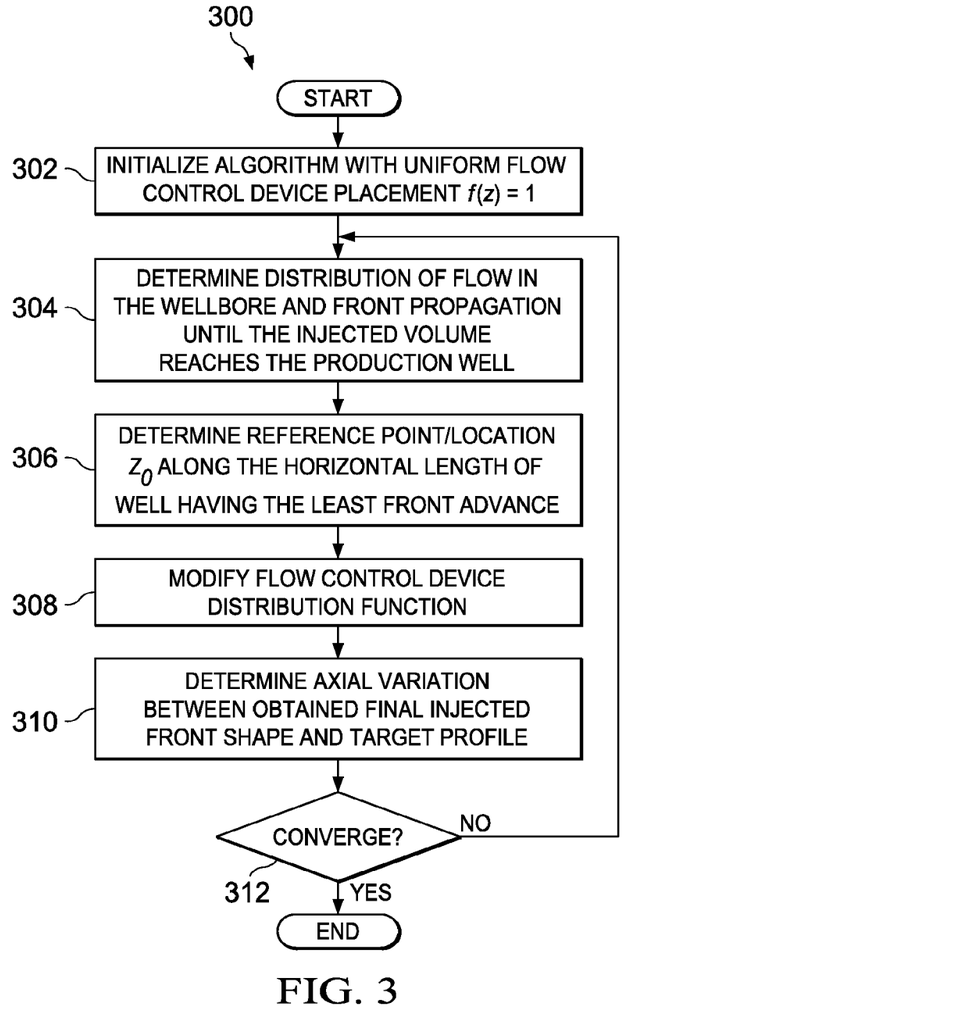
FIG. 3 is a flowchart depicting an example of computer-implemented method for determining the optimum properties for flow control devices on a production well in coupled injector-producer liquid flooding systems that yields a uniform displacement front towards the production well in accordance with a disclosed embodiment.

For example, FIG. 3 illustrates a flowchart depicting an example of computer-implemented method 300 for determining the optimum flow control device properties for a production well in coupled injector-producer liquid flooding systems that yields a uniform flooding front along the wellbore for maximizing the overall recovery of oil in accordance with the disclosed embodiments. The process 300 begins at step 302 by using an initial uniform FCD placement $f(z)=1$ (e.g., assume all FCDs are fully open) in accordance with Equation 14.

$$f(z) = f_0(z) = 1; 0 \leq z \leq L \qquad \text{(Equation 14)}$$

At step 304, the process determines the distribution of flow in the wellbore and front propagation until the injected volume reaches the production well. For instance, in one embodiment, the disclosed process determines the evolution of the displacement front y(z,t) by integrating Equation 8 (e.g., using the Runge-Kutta integration method or other suitable integrations methods), while the distributions of pressure and flow rate in the wellbore are calculated at each time step using Equations 1-7. In one embodiment, the disclosed process stops the time integration at time $t=t_m$ when the below condition (Equation 15) is reached, where n is the iteration number.

$$y^n(z, t_m) = d - r_0 \qquad \text{(Equation 15)}$$

The process at step 306 determines a point/location $z_0$ along the horizontal injection length of the wellbore having the least front advance in accordance with the following condition/equation:

$$y^1(z_0, t_m) = \min[y^1(z, t_m)]; 0 \leq z \leq L \qquad \text{(Equation 16)}$$

In one embodiment, the point $z_0$ and the corresponding value of the FCD distribution function $f(z_0)$ remains fixed for all of the following iterations:

$$f_n(z_0) = 1; n=1,2,\ldots \qquad \text{(Equation 17)}$$

where n is the iteration number.

At step 308, based on the results of step 304, the process modifies the FCD distribution function. For instance, in one embodiment, the disclosed process decreases values of the FCD distribution function at points where the front has advanced compared to position z=z0. For example, in one embodiment, the process uses the following equation for performing the adjustment:

$$f^{n+1}(z) = \left[\frac{y^n(z_0, t_m)}{y^n(z, t_m)}\right] f^n(z) \quad \text{(Equation 18)}$$

The process at step 310, determines the axial variation Δ between the obtained final injected front shape and the target profile. For example, in one embodiment, the process uses the following equation for determining the axial variation Δ:

$$\Delta = \max[y^{n+1}(z,t_m)] - \min[y^{n+1}(z,t_m)]; 0 \le z \le L; \quad \text{(Equation 19)}$$

At step 312, the process determines whether the axial variation Δ is within a predetermined convergence value (i.e., Δ≤εd). For example, in one embodiment, the ε is of order $10^{-5}$. In certain embodiments, the value of ε may vary or be determined by a user. If the deviation is not within the predetermined convergence value, the process returns to step 302 and repeats the disclosed process. However, if the deviation is within the predetermined convergence value, then process determines the corresponding function $f^{n+1}(z)$ that yields the optimized FCD properties, with process 300 terminating thereafter. In certain embodiments, if the wells are not parallel to each other, d (the distance between the wells) will depend on coordinate z, but the disclosed process remains applicable.

To help further describe the disclosed embodiments, FIGS. 4-7 illustrate a set of examples that demonstrate how the disclosed embodiments can be applied in various practical situations. In the given examples, the algorithm is configured to assume that the both injection and production horizontal wells have a diameter 0.114 m and a length 2500 m. A gap of d=100 m separates the horizontal injector and producer wells. Water is chosen as the injection fluid with viscosity $10^{-3}$ Pa s, while the oil viscosity is equal to 0.15 Pa s. The reservoir absolute permeability is set to 0.1 Darcy and porosity to 0.07. The FCD default hole diameter $D^0_{or}$ is 3 mm with spacing $L^0_{or}$ equal to 12 m. The reservoir boundary pressure $p_B$ is set as a constant value 10.25 bar, while the pressures at the toe of injector and producer are equal to 15 bar and 12.25 bar, respectively. One of ordinary skill in the art would recognize that the disclosed embodiments are not limited to the above example parameters and may vary depending on the actual parameters of a particular well.

Figure 4:
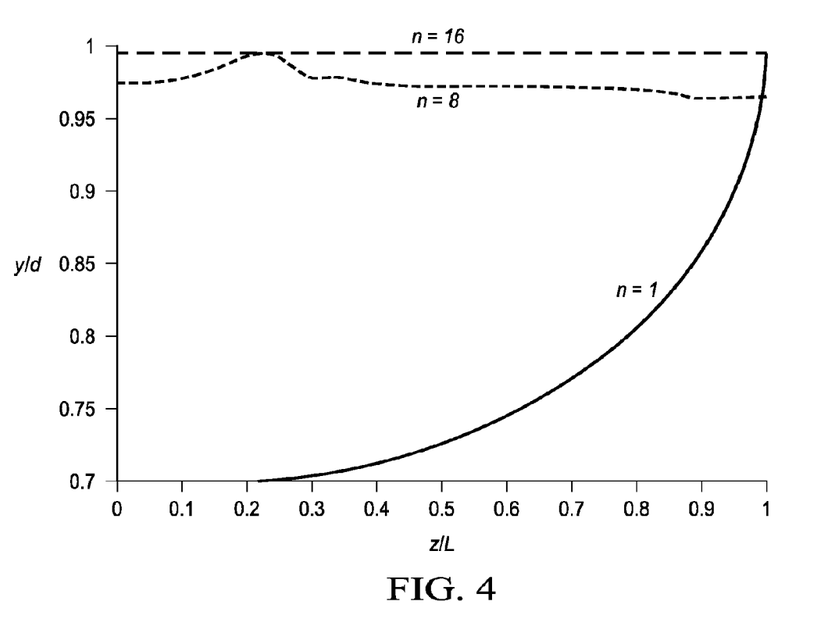
FIG. 4 is a diagram that illustrates an example of a graph that depicts the convergence of the disclosed process in the case of a formation having uniform properties in accordance with the disclosed embodiments.

The convergence of the disclosed process is illustrated by FIG. 4, which depicts the final shape of the displacement front at maximum time $t=t_m$. The position z=0 corresponds to the toe end of the wells. As described above, calculations at the first iteration are performed assuming uniform placement of FCD, which results in breakthrough at the heel (z=L). In the simulated example, the disclosed process/algorithm converges fast and at iteration 16, the flat shape of the front is achieved, indicating that the optimization is successful.

Figure 5:
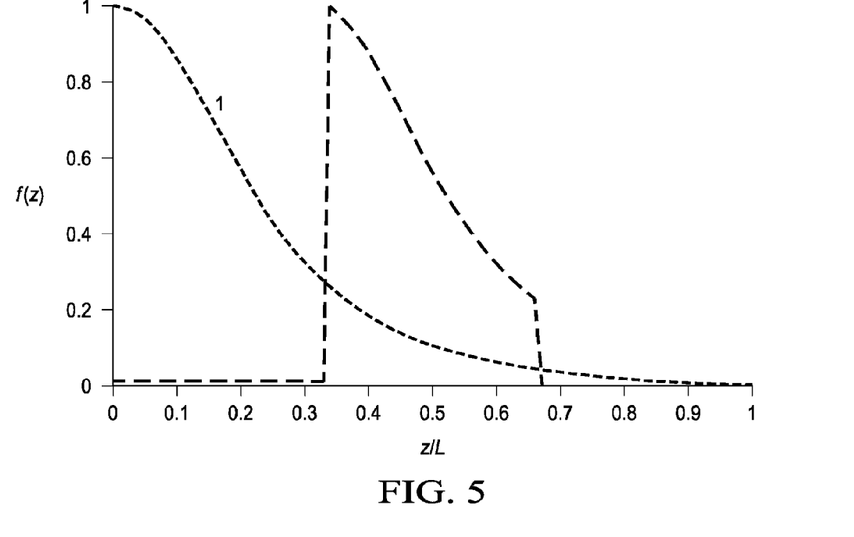
FIG. 5 is a diagram that illustrates an example of a graph that depicts the flow control device distribution function for a formation having uniform properties and for a formation having a step-wise change in permeability in accordance with the disclosed embodiments.
Figure 6:
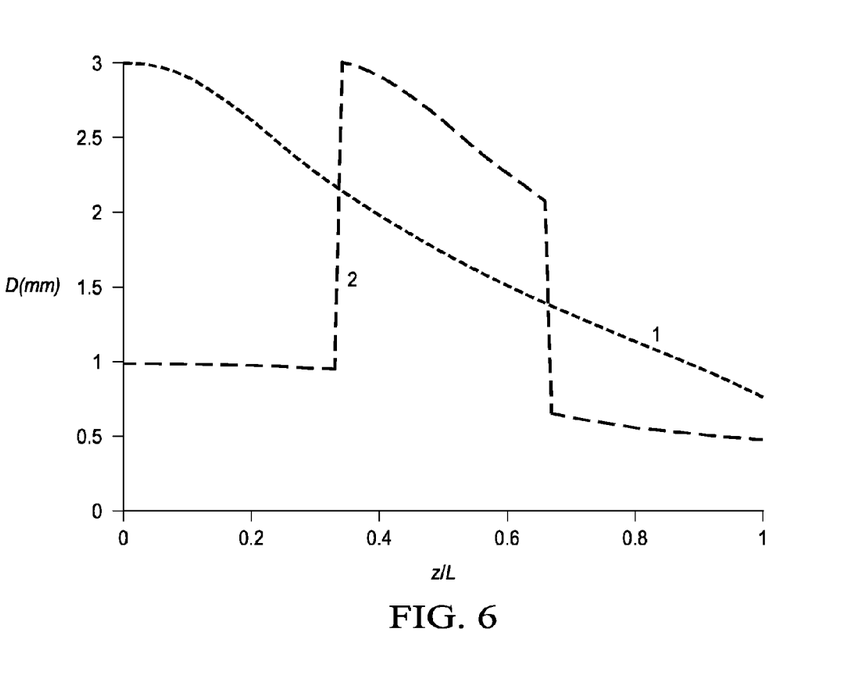
FIG. 6 is a diagram that illustrates an example of a graph that depicts the optimized distribution of the flow control device diameter for a formation having uniform properties and for a formation having a step-wise change in permeability in accordance with the disclosed embodiments.

FIG. 5 illustrates the corresponding FCD distribution function as indicated by line 1 in the graph. The depicted result, based the set of Equations 5-5.3, yields the optimized distribution of the FCD orifice diameter along the production well, as indicated by line 1 in FIG. 6. The FCD diameter reduction at heel increases the hydrodynamic pressure drop across the FCD, which in turn reduces the injection rate in the area so that the resulting final displacement front shape is uniform.

Figure 7:
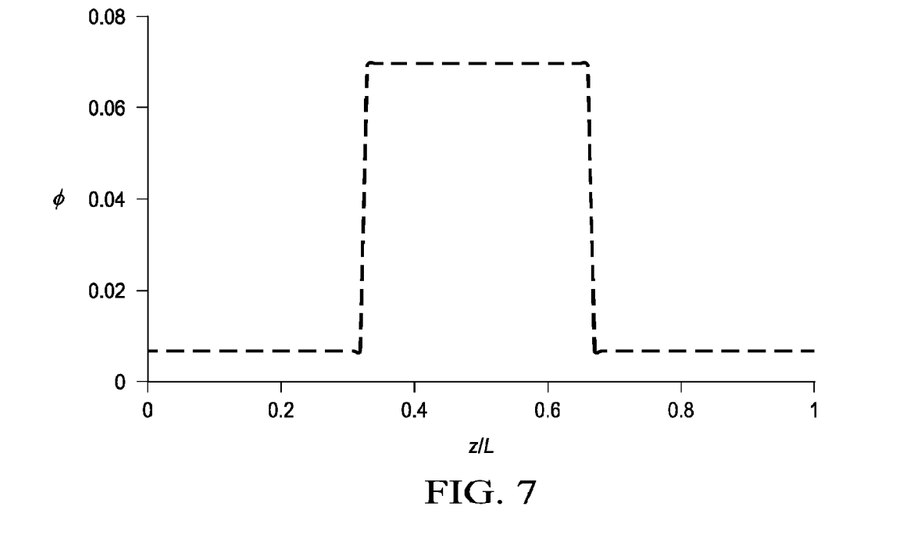
FIG. 7 is a diagram that illustrates an example of a graph that depicts a profile of porosity with a step-wise change in accordance with the disclosed embodiments.

Very often, the material properties of the formation change along the direction of the wells. Thus, in accordance with a second example of the disclosed embodiments, the disclosed process/algorithm is configured to assume that all parameters of the injection and production wells, as well as the liquid properties are the same as in Example 1, but the formation porosity φ changes stepwise as shown in FIG. 7. The absolute permeability $k_0$ of reservoir is assumed to be proportional to the porosity and changes correspondingly, while all other parameters remain constant.

The increase of the reservoir permeability in the center of the domain results in the reduction of the pressure gradient in the area, which reduces the velocity of the displacement front according to Equation 5, while the ratio $k_0/\phi$ remains constant everywhere:

$$V_f = -\frac{k_0 k'_{in}}{\varphi \Delta S_{in} \mu_{in}} \frac{\partial p}{\partial y} \quad \text{(Equation 20)}$$

Placement of FCDs with equal properties in such a situation would result in higher breakthrough risk in the beginning and end parts of the production well. To compensate for this effect, the diameters of the FCDs in the middle part of the producer need to be increased compared to the side areas, as shown by line 2 in FIG. 6. Accordingly, the FCD placement with this distribution of nozzle diameters, calculated by the disclosed process/algorithm, would result in uniform displacement front and least risk of water breakthrough.

Figure 8:
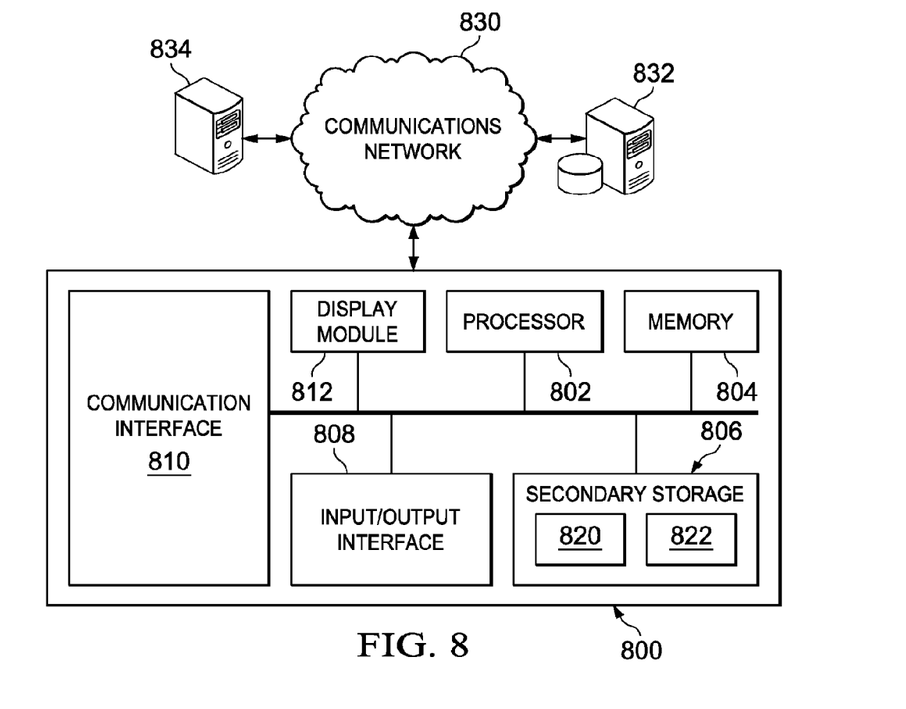
FIG. 8 is a block diagram illustrating one embodiment of a system for implementing the disclosed embodiments.

Referring now to FIG. 8, a block diagram illustrating one embodiment of a system 800 for implementing the features and functions of the disclosed embodiments is presented. The system 800 may be any type of computing device including, but not limited to, a desktop computer, a laptop, a server, a mainframe, a tablet, and a mobile device. The system 800 includes, among other components, a processor 802, memory 804, secondary storage unit 806, an input/output interface module 808, and a communication interface module 810.

The processor 802 may be any type microprocessor including single core and multi-core processors capable of executing instructions for performing the features and functions of the disclosed embodiments. The input/output interface module 808 enables the system 800 to receive user input (e.g., from a keyboard and mouse) and output information to one or more devices such as, but not limited to, printers, external data storage devices, and audio speakers. The system 800 may optionally include a separate display module 812 to enable information to be displayed on an integrated or external display device. For instance, the display module 812 may include instructions or hardware (e.g., a graphics card or chip) for providing enhanced graphics, touchscreen, and/or multi-touch functionalities associated with one or more display devices.

Memory 804 is volatile memory that stores currently executing instructions/data or instructions/data that are prefetched for execution. The secondary storage unit 806 is non-volatile memory for storing persistent data. The secondary storage unit 806 may be or include any type of data storage component such as a hard drive, a flash drive, or a memory card. In one embodiment, the secondary storage unit 806 stores the computer executable code/instructions and other relevant data for enabling a user to perform the features and functions of the disclosed embodiments.

For example, in accordance with the disclosed embodiments, the secondary storage unit 806 may permanently store executable code/instructions 820 for performing the above-described flow control device optimization process. The instructions 820 associated with the flow control device optimization process are then loaded from the secondary storage unit 806 to memory 804 during execution by the processor 802 for performing the disclosed embodiments. In addition, the secondary storage unit 806 may store other executable code/instructions and data 822 such as, but not limited to, a wellbore simulator application and/or a reservoir simulation application for use with the disclosed embodiments.

The communication interface module 810 enables the system 800 to communicate with the communications network 830. For example, the network interface module 808 may include a network interface card and/or a wireless transceiver for enabling the system 800 to send and receive data through the communications network 830 and/or directly with other devices.

The communications network 830 may be any type of network including a combination of one or more of the following networks: a wide area network, a local area network, one or more private networks, the Internet, a telephone network such as the public switched telephone network (PSTN), one or more cellular networks, and wireless data networks. The communications network 830 may include a plurality of network nodes (not depicted) such as routers, network access points/gateways, switches, DNS servers, proxy servers, and other network nodes for assisting in routing of data/communications between devices.

For example, in one embodiment, the system 800 may interact with one or more servers 834 or databases 832 for performing the features of the disclosed embodiments. For instance, the system 800 may query the database 832 for well log information for creating a coupled wellbore-reservoir model in accordance with the disclosed embodiments. Further, in certain embodiments, the system 800 may act as a server system for one or more client devices or a peer system for peer to peer communications or parallel processing with one or more devices/computing systems (e.g., clusters, grids).

Accordingly, the disclosed embodiments provide a system and computer implemented method that is able to determine, using a numerical algorithm and simulation process, the optimum FCD placements or other properties such as, but not limited to, hole diameter, for FCDs on a production well that yields a uniform flooding front along the wellbore to prevent the premature breakthrough of injection fluid.

One advantage of the disclosed embodiments is that it can be applied to coupled wellbore-reservoir simulations of various complexity levels. Another advantage is that the disclosed process is computationally efficient as it is optimized for a specific set of problems and is much simpler than a universal optimization method. In addition, the disclosed process exhibits an excellent convergence as it does not involve the Lagrange multipliers.

As stated above, a traditional approach for flow control device placement/optimization involves running multiple reservoir models and choosing the best design (which is usually good, but not optimal) from a set of simulations with different completion placements. In contrast, application of the disclosed embodiments would not only yield to the best placement/optimization design, but also substantially reduce the total computational effort.

In certain embodiments, the disclosed embodiments may be used to provide a very good initial guess for CPU-expensive simulations involving detailed 3D models (for example field reservoir simulations), thus saving days of simulation time. In one embodiment, the disclosed processes may be integrated into production simulation software package (e.g., NETool™). Moreover, the disclosed process is flexible enough to account for many physical phenomena and reservoir conditions that might be not captured by the reservoir simulator model but be seen in the formation from the log measurements. Additionally, in certain embodiments, vertical-horizontal anisotropy of permeabilities can be accounted for by using effective permeabilities.

While specific details about the above embodiments have been described, the above hardware and software descriptions are intended merely as example embodiments and are not intended to limit the structure or implementation of the disclosed embodiments. For instance, although many other internal components of the system 800 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed below.

Example 1 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 2 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 3 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value, wherein the predetermined convergence value is 10-5 of the distance between the injection well and the production well; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 4 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well.

Example 5 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining various hole diameters of the FCDs along the length of the production well.

Example 6 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining placement of the FCDs along the length of the production well.

Example 7 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein an injection well and the production well are nonparallel.

Example 8 is a computer implemented method for determining FCD properties for a production well in coupled injector-producer liquid flooding systems that yields a uniform flooding front along the production well, the method comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well, wherein determining the FCD properties includes determining at least one of various hole diameters of the FCDs and placement of the FCDs along the length of the production well.

Example 9 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 10 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 11 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value, wherein the predetermined convergence value is 10-5 of the distance between the injection well and the production well; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 12 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well.

Example 13 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining various hole diameters of the FCDs along the length of the production well.

Example 14 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining placement of the FCDs along the length of the production well.

Example 15 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein an injection well and the production well are nonparallel.

Example 16 is a system, comprising: at least one processor; and at least one memory coupled to the at least one processor, the at least one memory storing computer executable instructions for determining flow control device (FCD) properties for a production well in coupled injector-producer liquid flooding systems that yields a uniform flooding front along the production well, the computer executable instructions comprises instructions for: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well, wherein determining the FCD properties includes determining at least one of various hole diameters of the FCDs and placement of the FCDs along the length of the production well.

Example 17 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 18 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 19 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value, wherein the predetermined convergence value is 10-5 of the distance between the injection well and the production well; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well.

Example 20 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well.

Example 21 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining various hole diameters of the FCDs along the length of the production well.

Example 22 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein determining the FCD properties includes determining placement of the FCDs along the length of the production well.

Example 23 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function; determining an axial variation between obtained final injected front shape and target profile; determining whether the axial variation is within a predetermined convergence value; responsive to a determination that the axial variation is not within the predetermined convergence value, repeating the loop; responsive to a determination that the axial variation is within the predetermined convergence value, exiting the loop; and determining the FCD properties for the production well that yields the uniform flooding front along the production well, wherein an injection well and the production well are nonparallel.

Example 24 is a non-transitory computer readable medium comprising computer executable instructions for determining FCD properties for a production well in coupled injector-producer liquid flooding systems that yields a uniform flooding front along the production well, the computer executable instructions when executed causes one or more machines to perform operations comprising: initializing a FCD distribution function to have a uniform FCD distribution profile; executing a loop of instructions that perform operations comprising: determining distribution of flow in the injection well and front propagation until an injected volume reaches the production well; determining a reference location along a length of the injection well having a least front advance; adjusting the FCD distribution function by decreasing values of the FCD distribution function at points where the front has advanced compared to the front at the reference location; determining an axial variation between obtained final injected front shape and target profile; determining whether the axial variation is within a predetermined convergence value; responsive to a determination that the axial variation is not within the predetermined convergence value, repeating the loop, wherein the reference location along a length of the injection well does not change during subsequent iterations of the loop; responsive to a determination that the axial variation is within the predetermined convergence value, exiting the loop; and determining the FCD properties for the production well that yields the uniform flooding front along the production well, wherein determining the FCD properties includes determining at least one of various hole diameters of the FCDs and placement of the FCDs along the length of the production well.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

The invention claimed is:

1. A computer implemented method for determining flow control device (FCD) properties of one or more flow control devices that yield a uniform displacement front along a production well in a coupled injector-producer liquid flooding system within a formation, the method comprising:
   initializing, by a computer system, a FCD distribution function to have a uniform FCD distribution profile;
   simulating, by the computer system, propagation of a displacement front representing a volume of liquid injected from an injection well into a reservoir area of the formation between the injection well and the production well, based on the initialized FCD distribution function;
   determining a pressure distribution in the reservoir area and a location of the displacement front when it reaches the production well during the simulation;
   determining a reference location along a length of the injection well, based on the pressure distribution and the location of the displacement front, the reference location corresponding to a point along the displacement front where the simulated displacement front propagation is determined to be at a minimum;
   adjusting the FCD distribution function by decreasing values of the FCD distribution function at points where the displacement front has advanced compared to the displacement front at the reference location;
   determining whether an axial variation between a shape of the displacement front according to the adjusted FCD distribution function and a target profile is within a predetermined convergence value;
   when the axial variation is determined not to be within the predetermined convergence value, repeating the simulation of the displacement front propagation and the adjustment of the FCD distribution function until the axial variation is determined to be within the predetermined convergence range;
   when the axial variation is determined to be within the predetermined convergence value, determining the FCD properties of the one or more flow control devices along the production well that yield the uniform displacement front along the production well; and
   controlling a flow of fluid from the reservoir area of the formation into the production well using the one or more flow control devices along the production well according to the determined FCD properties that yield the uniform displacement front during liquid injection from the injection well.

2. The computer implemented method of claim 1, wherein the predetermined convergence value is $10^{-5}$ of the distance between the injection well and the production well.

3. The computer implemented method of claim 1, wherein the reference location along the length of the injection well does not change during subsequent iterations of the simulation of the displacement front propagation and the adjustment of the FCD distribution function.

4. The computer implemented method of claim 1, wherein determining the FCD properties includes determining various hole diameters of the FCDs along the length of the production well.

5. The computer implemented method of claim 1, wherein determining the FCD properties includes determining placement of the FCDs along the length of the production well.

6. The computer implemented method of claim 1, wherein the injection well and the production well are nonparallel.

7. The computer implemented method of claim 1, wherein the injection well is located near an injection zone of the reservoir area within the formation, the production well is located near a production zone of the reservoir area within the formation, and the volume of liquid is injected from the injection well into the injection zone of the reservoir area.

8. A system, comprising:
at least one processor; and
at least one memory coupled to the at least one processor, the at least one memory storing processor executable instructions, which, when executed by the at least one processor, cause the at least one processor to perform a plurality of operations, including operations for:
initializing a FCD distribution function to have a uniform FCD distribution profile;
simulating propagation of a displacement front representing a volume of liquid injected from an injection well into a reservoir area of the formation between the injection well and a production well, based on the initialized FCD distribution function;
determining a pressure distribution in the reservoir area and a location of the displacement front when it reaches the production well during the simulation;
determining a reference location along a length of the injection well, based on the pressure distribution and the location of the displacement front, the reference location corresponding to a point along the displacement front where the simulated displacement front propagation is determined to be at a minimum;
adjusting the FCD distribution function by decreasing values of the FCD distribution function at points where the displacement front has advanced compared to the displacement front at the reference location;
determining whether an axial variation between a shape of the displacement front according to the adjusted FCD distribution function and a target profile is within a predetermined convergence value;
when the axial variation is determined not to be within the predetermined convergence value, repeating the simulation of the displacement front propagation and the adjustment of the FCD distribution function until the axial variation is determined to be within the predetermined convergence range;
when the axial variation is determined to be within the predetermined convergence value, determining FCD properties of one or more flow control devices along the production well that yield a uniform displacement front along the production well; and
controlling a flow of fluid from the reservoir area of the formation into the production well using the one or more flow control devices along the production well according to the determined FCD properties that yield the uniform displacement front during liquid injection from the injection well.

9. The system of claim 8, wherein the predetermined convergence value is $10^{-5}$ of the distance between the injection well and the production well.

10. The system of claim 8, wherein the reference location along the length of the injection well does not change during subsequent iterations of the simulation of the displacement front propagation and the adjustment of the FCD distribution function.

11. The system of claim 8, wherein determining the FCD properties includes determining various hole diameters of the FCDs along the length of the production well.

12. The system of claim 8, wherein determining the FCD properties includes determining placement of the FCDs along the length of the production well.

13. The system of claim 8, wherein the injection well and the production well are nonparallel.

14. The system of claim 8, wherein the injection well is located near an injection zone of the reservoir area within the formation, the production well is located near a production zone of the reservoir area within the formation, and the volume of liquid is injected from the injection well into the injection zone of the reservoir area.

15. A non-transitory computer readable medium comprising computer executable instructions for determining flow control device (FCD) properties of one or more flow control devices that yield a uniform displacement front along a production well in a coupled injector-producer liquid flooding system within a formation, the computer executable instructions, when executed by the computer, cause the computer to perform operations comprising:
initializing a FCD distribution function to have a uniform FCD distribution profile;
simulating propagation of a displacement front representing a volume of liquid injected from an injection well into a reservoir area of the formation between the injection well and the production well, based on the initialized FCD distribution function;
determining a pressure distribution in the reservoir area and a location of the displacement front when it reaches the production well during the simulation;
determining a reference location along a length of the injection well, based on the pressure distribution and the location of the displacement front, the reference location corresponding to a point along the displacement front where the simulated displacement front propagation is determined to be at a minimum;
adjusting the FCD distribution function by decreasing values of the FCD distribution function at points where the displacement front has advanced compared to the displacement front at the reference location;
determining whether an axial variation between a shape of the displacement front according to the adjusted FCD distribution function and a target profile is within a predetermined convergence value;
when the axial variation is determined not to be within the predetermined convergence value, repeating the simulation of the displacement front propagation and the adjustment of the FCD distribution function until the axial variation is determined to be within the predetermined convergence range;
when the axial variation is determined to be within the predetermined convergence value, determining the FCD properties of the one or more flow control devices along the production well that yield the uniform displacement front along the production well; and
controlling a flow of fluid from the reservoir area of the formation into the production well using the one or more flow control devices along the production well according to the determined FCD properties that yield the uniform displacement front during liquid injection from the injection well.

16. The non-transitory computer readable medium of claim 15, wherein determining the FCD properties includes determining various hole diameters of the FCDs along the length of the injection well.

17. The non-transitory computer readable medium of claim 15, wherein determining the FCD properties includes determining placement of the FCDs along the length of the injection well.

18. The non-transitory computer readable medium of claim 15, wherein the predetermined convergence value is $10^{-5}$ of the distance between the injection well and the production well.

19. The non-transitory computer readable medium of claim 15, wherein the reference location along the length of the injection well does not change during subsequent iterations of the simulation of the displacement front propagation and the adjustment of the FCD distribution function.

20. The non-transitory computer readable medium of claim 15, wherein the injection well is located near an injection zone of the reservoir area within the formation, the production well is located near a production zone of the reservoir area within the formation, and the volume of liquid is injected from the injection well into the injection zone of the reservoir area.

* * * * *